United States Patent Office 3,790,673
Patented Feb. 5, 1974

3,790,673
METHOD OF VIRUS SUPPRESSION BY HYDANTOINS
Koert Gerzon and Charles W. Ryan, Indianapolis, Ind., and Donald C. De Long, Canberra, ACT, Australia, assignors to Eli Lilly and Company, Indianapolis, Ind.
No Drawing. Filed June 1, 1972, Ser. No. 258,617
Int. Cl. A61k 27/00
U.S. Cl. 424—273        7 Claims

ABSTRACT OF THE DISCLOSURE 5-(3',4'-dichlorophenyl)-5-methylhydantoin and homologs thereof useful in suppressing viral growth both in vivo and in vitro.

BACKGROUND OF THE INVENTION

Racemic 5 - (3',4'-dichlorophenyl)-5-methylhydantoin has been reported as being active in suppressing audiogenic seizures in mice. [See Quadbeck and Röhm, Arzneimittl. 6, 531 (1956).] Hydantoin, itself, and six other substituted hydantoins were tested by Weinstein et al., Antib. and Chemother. 7, 443 (1957) in vitro against influenza virus. Only hydantoin and 1-benzoyl-2-thiohydantoin were found to be active whereas 5-5-dimethylhydantoin and 5,5-diphenylhydantoin were found to be inactive. Neither of the active compounds in vitro protected mice against influenza virus.

There is no known prior art reference to antiviral activity of enantiomorphs of unsymmetrically-substituted hydantoins.

DESCRIPTION OF THE INVENTION

This invention provides a method for suppressing viral growth comprising contacting a virus with a virucidal amount of a compound represented by the formula:

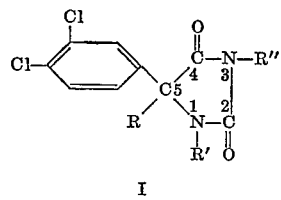

I wherein,

R is methyl, ethyl, or isopropyl, and
R' and R" are hydrogen or methyl, at least one of R' and R" being hydrogen.

Also included within the scope of this invention is the use as viral suppressants of nontoxic cationic salts of the above hydantoins. By the term "nontoxic cationic salts" is meant salts formed with those metals which are not poisonous to an animal organism, as for example the sodium salt, the potassium salt, the ammonium salt, the trimethylammonium salt, and the like.

Illustrative compounds useful in the processes of this invention include:

5-(3',4'-dichlorophenyl)-5-methylhydantoin
5-(3',4'-dichlorophenyl)-5-ethylhydantoin
5-(3',4'-dichlorophenyl)-5-isopropylhydantoin
5-(3',4'-dichlorophenyl)-5-ethyl-1-methylhydantoin
5-(3',4'-dichlorophenyl)-5-isopropyl-3-methylhydantoin Compounds coming within the scope of the above formula are capable of existing in different spatial configurations since the 5 carbon is an asymmetric carbon; thus each of the above compounds exists as a dl-pair or racemate. Of the two enantiomorphs constituting a given racemate, the l-isomer is far more active in suppressing viral growth than is the d-isomer, and l-isomers of compounds of the above formula constitute a preferred species in the antiviral processes of this invention.

Compounds corresponding to the above formula in which R' and R" are both hydrogen are prepared by condensing an alkyl 3,4-dichlorophenyl ketone

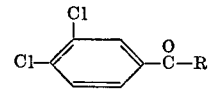

wherein R has the same meaning as hereinabove with ammonium carbonate and potassium cyanide. The 3-methyl derivatives of the above hydantoins are prepared by a simple alkylation procedure since the imide hydrogen in the 3-position is more acidic than the amide hydrogen in the 1-position and therefore is alkylated preferentially. The 1-methyl derivatives are prepared by a more involved procedure in which the 3-position is alkylated with a removable blocking group, the 1-position methylated by standard procedures and then the blocking group in the 3-position removed as by opening the hydantoin ring to yield an α-phenyl-α-methylamino-α-alkylacetic acid which, on treatment with molten urea, yields the desired 1-methylhydantoin derivative.

Resolution of the above hydantoins to yield the optical antipodes thereof is readily accomplished by opening the hydantoin ring to yield a dl-(3',4'-dichlorophenyl)alanine, dl-α-aminobutyric or dl-valine as in the preparation of the 1-methylhydantoins, protecting the α-amino group as by formylation, and then forming salts of a single enantiomer with an optically active base such as cinchonine or cinchonidine. The optically pure enantiomer is then freed from the salt, deformylated, and reacted with molten urea to yield an optically active hydantoin.

The nontoxic cationic salts of compounds according to Formula I above are prepared by dissolving the hydantoin in ethanol or other suitable solvent, adding an equivalent amount of base, such as sodium hydroxide, sodium ethylate, potassium ethylate, ammonium hydroxide, trimethylammonium hydroxide or the like, and then removing the solvents by evaporation in vacuo, preferably using freeze-drying techniques. The cationic salt of the hydantoin remains as an amorphous residue. Extreme care must be exercised in handling the cationic salts of hydantoins since they are known to be hygroscopic in the noncrystalline or amorphous state.

The ability of compounds coming within the scope of the Formula I above to suppress the growth of different viruses in vitro is readily demonstrated by using a plaque suppression test similar to that described by Siminoff, Applied Microbiology, 9 (1), 66–72 (1961). The tests are carried out using rectangular glass boxes measuring 7½ inches x 15 inches x 1½ inches, made of pieces of double strength plate glass sealed together with silicone rubber cement. The glass boxes are covered with a glass lid and before use are sterilized by dry heat at a temperature of about 300° C. An approximately $10^6$/ml. BS–C–1 (serial culture of Cercopithecus monkey kidney) cell suspension is made in a medium composed of medium 199 together with 5 percent calf serum, 150 units/ml. of penicillin, and 150 mcg./ml. of streptomycin. Two hundred fifty milliliters of the suspension are added to each sterilized glass box, and the boxes are incubated at about 37° C. for about 96 hours in a level position. After incubation, the medium is carefully drawn off leaving a monolayer of cells undisturbed on the glass. The cells are then infected by gently adding to each box about 100 ml. of a suspension of the Coxsackie A21 (Coe strain) virus in medium 199.

After allowing a time of from about 1 to about 3 hours for adsorption of the virus on the cells, the infecting medium is removed from the plate. A mixture of 75 ml. of double strength medium 199 with calf serum, penicillin, and streptomycin and 75 ml. of double strength agar (Difco purified) solution (2 percent) at 50° C. is poured over the virus-infected cell monolayer in each box and allowed to solidify at a level attitude. Filter paper disks are dipped in solutions of substances to be tested, dried in a vacuum oven at no higher than 37° C. for about one hour and then placed on the surface of the agar in the boxes. The boxes are incubated at about 37° C. for about 84 hours, the boxes are flooded with aqueous 10 percent formalin-2 percent sodium acetate solution, and the agar is floated off with water. The cells remaining are stained with Wright's stain. Toxicity, antiviral activity, and the microscopic apperance of the cells are recorded following the procedure of Herrmann et al., Proc. Soc. Exp. Biol. and Med., 103, 625 (1960).

Plaques are seen in those areas of the plate where the virus has infected and reproduced in the cells. Zones of toxicity are observed and the diameter thereof measured in millimeters when the test compound kills the cells under and around the filter paper disk. Antiviral activity of the test compounds is determined by counting the number of plaques per 25 square centimeters.

Table I, which follows, gives the number of plaques for 25 square cm. at a series of decreasing concentrations for dl-5-(3',4'-dichlorophenyl)-5-methylhydantoin and for its pure optical antipodes.

TABLE I.—NUMBERS OF PLAQUE

| Concentration, mcg./ml. | dl-5-(3',4'-dichloro-phenyl)-5-methyl hydantoin | d-5-(3', 4'-dichloro-phenyl)-5-methyl hydantoin | l-5-(3',4'-dichloro phenyl)-5-methyl hydantoin |
| --- | --- | --- | --- |
| 75 | (1) | 3 | (1) |
| 50 | 0 | 61 | 0 |
| 40 | 0 | 110 | 0 |
| 30 | 0 | 122 | 0 |
| 20 | 2 | 144 | 0 |
| 10 | 23 | 138 | 0 |
| 5 | 57 | 148 | 21 |
| 2.5 | 103 | 140 | 83 |
| 1.25 | 142 | 154 | 122 |
| 0 | 183 | 183 | 183 |

[1] Sl. toxic.

The amount of virucidal drug necessary to reduce the number of plaques by 50 percent is as follows:

dl-5-(3',4'-dichlorophenyl)-5-methylhydantoin=about 5.0 mcg./ml.;

d-5-(3',4'-dichlorophenyl)-5-methylhydantoin=about 5.0 mcg./ml.

l-5-(3',4'-dichlorophenyl)-5-methylhydantoin=about 2.5 mcg./ml.

dl-5-(3',4'-dichlorophenyl)-5-ethylhydantoin=about 10 mcg./ml.

dl-5-(3',4'-dichlorophenyl)-5-isopropylhydantoin=about 2.5 mcg./ml.

The use of compositions according to this invention in combatting viral infections is further illustrated by their ability to cure mice infected with Coxsackie A21 (Coe) virus. This virus was isolated by Lennette et al., Am. J. Hyg. 68, 272 (1959), from human patients with mild respiratory illness. After suitable adaptation to growth in the mouse [Underwood et al., Am. J. Hyg., 76, 124 (1962)], the virus produces in the mouse muscle degeneration and flaccid paralysis as well as respiratory involvement. (For a description of infections attributed to various stains of Coxsackie virus, see Topley and Wilson's Principles of Bacteriology and Immunology by Wilson and Miller, 5th ed., Williams and Wilkins, Baltimore, Md. vol. II, p. 2354 et seq.) The mouse-adapted Coxsackie A21 virus was employed usually in the form of a 1:10 dilution of the supernate of a 10 percent mouse gluteal muscle (obtained from infected mice) suspension. The compounds were administered to the mice as suspensions in 0.25 ml. of a sterile water (permissibly containing up to 3 percent of a nonionic surfactant) at a series of dose levels. The mice employed were SPF white Swiss mice weighing 11–13 grams. Ten mice were used for each drug level, and 3–5 groups of 10 mice each were used as controls. In this procedure, the control mice usually die on the fifth to eighth day after infection, and animals alive through the tenth day are considered survivors if free of paralysis.

Following the above procedure, it was determined that a single intraperitoneal dose of 8 mg./kg. of l-5-(3',4'-dichlorophenyl)-5-methylhydantoin gave a 50 percent survival rate in mice when administered 3 hours prior to injection of the virus.

The compounds of Formula I are also effective antiviral agents when administered orally. For example, 50 percent of a group of mice were protected against injections of lethal quantities of Coxsackie A21 virus by oral administration of 5 mg./kg. doses of l-5-(3',4'-dichlorophenyl)-5-methylhydantoin at any time from 3 hours pre-infection to 30 hours post-infection. Four oral doses of 5 mg./kg. given 24 hours. pre-infection and 3, 24 and 48 hrs. post-infection provided complete protection. Administratioon of a 20 mg./kg. dose of the same drug to mice completely protected the mice from lethal dose of Coxsackie A21 virus administered 24 hours later. Administration of the drug at intervals up to 48 hours post-infection also gave complete protection against Coxsackie A21 virus.

Another virus against which compounds represented by Formula I are active in vivo is infectious canine hepatitis (ICH). For example, in one trial, dl-5-(3',4'-dichlorophenyl) - 5 - methylhydantoin, administered by the intraperitoneal route at a dosage of 50 mg./kg. to dogs, protected the dogs against ICH virus challenge (1:12 dilution). The drug was given to each dog at the 50 mg./kg. dosage rate 25 and 1 hour before challenge.

The $LD_{50}$ in mice for l-5 - (3',4' - dichlorophenyl) - 5-methylhydantoin is in excess of 300 mg./kg.

In vitro (tissue culture) activity has been demonstrated against polio, ICH, canine distemper and Coxsackie A21 viruses. Thus, the compounds of Formula I can be used in aqueous solution, preferably with a surfactant, to decontaminate the in vitro habitatat on which Polio, Coxsackie, ICH or other viruses are present, including surfaces such as laboratory glassware, laboratory working surfaces and similar areas in hospitals, at concentrations ranging from 10 to 500 mcg./ml.

The compounds can be administered to mammals orally or intraperitoneally employing formulations and dosage forms that have been used in the past for administering hydantoins for use as anticonvulsants. Useful dosage levels for prevention or treatment of viral diseases vary from 1 to 100 mg./kg. of mammalian body weight depending on whether the drug is to be used as a prophylactic or as a cure. The non-toxic cationic salts of compounds represented by Formula I can also be employed in place of the hydantoin itself.

Compounds useful in the antiviral processes of this invention are prepared as follows:

EXAMPLE 1

Preparation of 5-(3',4'-dichlorophenyl)-5-methyl-hydantoin

A mixture containing 22.8 g. of 3',4'-dichloroacetophenone, 46.2 g. of ammonium carbonate, 15.6 g. of potassium cyanide, 150 ml. of ethanol and 150 ml. of water was placed in a sealed vessel and heated for 4 hours at 80° C. The vessel was opened and the contents removed. Two-thirds of the ethanol was removed under reduced pressure. The resulting solids were separated by filtration, the filter cake washed with 1:4 ethanol-water mixture and dissolved in about 135 ml. of 1 N sodium hydroxide. The basic solution was extracted with two 100 ml. portions of ether and the ether extracts discarded. The basic solution was then added slowly in dropwise fashion while being stirred vigorously into 165 ml. of 1 N hydrochloric acid.

5-(3',4'-dichlorophenyl (-5-methylhydantoin precipitated, the precipitate was separated by filtration and the filter cake washed with water. Recrystallization of the precipitate from hot aqueous ethanol yielded 5-(3',4'-dichlorophenyl) - 5 - methylhydantoin (24 g.) melting at about 199–200° C.

*Analysis.*—Calc: C, 46.36; H, 3.11; N, 10.81; Cl, 27.37. Found: C, 46.43; H, 3.33; N, 10.84; Cl, 27.42.

Following the above procedure, 5 - (3',4' - dichlorophenyl) - 5 - ethylhydantoin was prepared from 3',4'-dichloropropiophenone. The compound melted at about 213–215° C.

*Analysis.*—Calc: C, 48.37; H, 3.69; N, 10.26; Cl, 25.96. Found: C, 48.56; H, 3.95; N, 9.96; Cl, 25.89.

Also, following the above procedure, 5-(3',4'-dichlorophenyl)-5-isopropyl hydantoin was prepared from 3',4'-dichloro - isobutyrophenone. The compound melted at about 243–5° C.

*Analysis.*—Calc: C, 50.19; H, 4.21; N, 9.76; Cl, 24.69. Found: C, 49.91; H, 4.39; N, 9.88; Cl, 24.39.

EXAMPLE 2

Preparation of 5-(3',4'-dichlorophenyl)-3,5-dimethylhydrantoin

About 1.29 g. of 5-(3',4'-dichlorophenyl) - 5 - methylhydantoin were dissolved in 10 ml. of methanol. 0.63 g. of dimethyl sulfate and 1 ml. of 5 N sodium hydroxide were added from separate dropping funnels alternately in dropwise fashion with the sodium hydroxide being added first. The resulting mixture was stirred at room temperature for several hours. 5 ml. of water were added and the solvents removed in vacuo. Unchanged hydantoin was separated from the resulting solids by solution in sodium hydroxide, the 3-methyl derivative being insoluble. The residual solid was recrystallized from a mixture of hot benzene and hexane. 5-(3',4'-Dichlorophenyl) - 3,5 - dimethylhydantoin thus prepared melted at about 216° C.

*Analysis.*—Calc: C, 48.37; H, 3.69; N, 10.26. Found: C, 48.35; H, 3.97; N, 10.08.

EXAMPLE 3

Preparation of 5-(3',4'-dichlorophenyl)-1,5-dimethylhydantoin

About 7.7 g. of 5-(3',4'-dichlorophenyl) - 5 - methylhydantoin were dissolved in about 30 ml. of 1N aqueous sodium hydroxide. About 5.1 g. of benzyl bromide dissolved in a minimal amount of ethanol were added in dropwise fashion with stirring. The reaction mixture was stirred for an additional 4 hours and then filtered. The filter cake was dried. Recrystallization of the filter cake from a methanol-water solvent mixture yield purified 5-(3',4'-dichlorophenyl)-1-benzyl-5-methylhydantoin, melting at about 181–3° C.

*Analysis.*—Calc: C, 58.47; H, 4.04; N, 8.02; Cl, 20.30; O, 9.16. Found: C, 58.75; H, 4.15; N, 8.09; Cl, 20.21; O, 9.13.

About 6.3 g. of the above compound were dissolved in 150 ml. of acetone; 2.64 g. of solid potassium hydroxide dissolved in 10 ml. of water were added with stirring, thus forming the potassium salt of 5-(3',4'-dichlorophenyl)-1-benzyl-5-methylhydantoin. 5.04 g. of dimethyl sulfate dissolved in a minimum amount of acetone were added to the solution of the potassium salt in dropwise fashion. The reaction mixture was stirred for about 4 hours and was then filtered. The filtrate was evaporated in vacuo to remove acetone present therein and a further crop of crystals deposited in the aqueous solution. The second crop of crystalline material was separated by filtration and the two filter cakes combined. Recrystallization of the combined filter cakes from an ethanol-water mixture yielded 5-(3',4'-dichlorophenyl) - 3,5 - dimethyl-1-benzylhydantoin formed in the above reaction.

*Analysis.*—Calc: C, 59.52; H, 4.44; N, 7.71; O, 8.81; Cl, 19.51. Found: C, 59.36; H, 4.47; N, 7.50; O, 8.73; Cl, 19.80.

About 3.6 g. of the above hydantoin were dissolved in about 50 ml. of methanol. 100 ml. of 1 N aqueous sodium hydroxide were added and the combined solutions placed in a bomb. The reaction mixture was heated under pressure for about 16 hours at about 150° C. after which time the contents were cooled to room temperature and removed from the bomb. Methanol was removed in vacuo. The resulting aqueous solution was treated with about ⅓ the theoretical amount of Dowex 50 (H+) resin (1.3 milli-equivalents per milliliter equals about 70 ml. of resin). The aqueous solution containing the resin was stirred for several minutes and then the liquid was removed by decantation. The resin was washed with water and the wash added to the original decanted liquid. The same procedure was repeated twice more so that a total of 60 ml. of resin had eventually been added to the original aqueous solution. At this point the pH=7. The product of the above reaction, 2-(methylamino)-2-(3',4'-dichlorophenyl)propionic acid, precipitated and was separated from the resin by centrifugation. Recrystallization of the separated acid from methanol-water yielded 2-(methylamino)-2-(3',4' - dichlorophenyl)propionic acid which thus purified melted above 250° C.

About 1.5 g. of urea were stirred in an oil bath to a temperature above its melting point. About .6 g. of the above substituted propionic acid were added to the melted urea and the consequent reaction mixture stirred at about 180° C. for about 2 hours. Fifteen milliliters of water and an equal volume of 12 N hydrochloric acid were added. 5-(3',4'-dichlorophenyl)-1,5-dimethylhydantoin formed in the above reaction precipitated and was separated by filtration. Recrystallization of the hydantoin from an ethanol-water solvent mixture yielded purified material melting at about 185–7° C.

*Analysis.*—Calc.: C, 48.7; H, 3.67; N, 10.26; Cl, 25.96. Found: C, 48.8; H, 3.90; N, 10.15; Cl, 25.75.

The structure of the compound was confirmed by mass spectrograph and nuclear magnetic resonance spectrum.

EXAMPLE 4

Preparation of Enantiomorphs of 5-(3',4'-dichlorophenyl)-5-methylhydantoin

Following the procedure of Example 3 for the preparation of 2-(3',4'-dichlorophenyl)-2-methylaminopropionic acid, 5-(3',4'-dichlorophenyl) - 5 - methylhydantoin was heated in a bomb with aqueous sodium hydroxide to yield racemic 3',4'-dichlorophenylalanine. Four grams of the phenylalanine were treated with 100 ml. of 98% formic acid plus 4 ml. of acetic anhydride to yield N-formyl-(3',4'-dichlorophenyl) alanine. Twenty grams of the above N-formyl compound were dissolved in anhydrous ethanol and mixed with a solution of cinchonine in anhydrous ethanol. The resulting salt was separated by filtration and recrystallized from anhydrous ethanol. The salt was neutralized thus yielding the liberated acid which was in turn treated with a solution of cinchonine to form the salt. This process was repeated several times until d(+)-N-formyl-(3,'4'-dichlorophenyl)alanine having an $[\alpha]_D = +71°$ was obtained. Recrystallization of this material from anhydrous ethanol yielded purified d(+)-N-formyl-(3',4'-dichlorophenyl)alanine having an $[\alpha]_D = +86°$. Filtrates from the several cinchonine salt formation steps outlined above were combined and were treated with cinchonidine to form salts in the same fashion as outlined above. Purified l(—) - N - formyl-(3',4'-dichlorophenyl)alanine obtained in this fashion was recrystallized from an isopropanol-water solvent mixture to yield the levo enantiomorph having an $[\alpha]_D = -94°$ C.

The two enantiomorphic free acids were obtained from their respective N-formyl derivatives isolated as indicated above by hydrolysis in 10 percent aqueous hydrochloric acid. Evaporation of the acidic solutions yielded (3',4'- dichlorophenyl)alanine hydrochloride in both enantiomorphic (d and l) forms. Treatment of the hydrochloride salts with molten urea, as outlined in the previous example, yielded d(+)-(3',4'-dichlorophenyl)-5-methylhydantoin and l(−)-5-(3',4'-dichlorophenyl)-5-methylhydantoin. The d(+)-hyddantoin melted at about 235–8° C. after recrystallization from isopropanol, $[\alpha]_D = +99.1°$. The l(−)-isomer melted at about 239–42° C., $[\alpha]_D = -98.5$.

EXAMPLE 5

Preparation of Sodium Salt of 5-(3',4'-dichlorophenyl)-5-methylhydantoin

One mole of 5-(3',4'-dichlorophenyl)-5-methylhydantoin was treated with an ethanol solution containing 1 mole of sodium hydroxide. An equal volume of water was added and the ethanol removed in vacuo. The pH of the solution remaining was 7.5. Freeze drying yielded the sodium salt of 5-(3',4'-dichlorophenyl)-5-methylhydantoin.

Other salts of 5-(3',4'-dichlorophenyl)-5-methylhydantoin are prepared by the above procedure by substituting the appropriate base for sodium hydroxide in the above example.

We claim:

1. The method for supressing the growth of a virus selected from the group consisting of Coxsackie and Infectious Canine Hepatitis viruses which comprises administering to a mammal susceptible to said virus infection an effectve dose of a hydantoin represented by the formula:

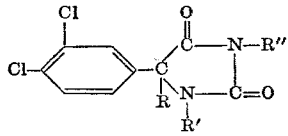

wherein R is methyl, ethyl or isopropyl, and R' and R" are hydrogen or methyl, at least one of R' and R" being hydrogen; or a nontoxic cationic salt thereof.

2. The method according to claim 1 wherein the antiviral hydantoin is administered at a dosage rate 1–100 mg./kg. of mammalian body weight per day.

3. The method according to claim 1 wherein the antiviral hydantoin is administered to a mammal by the oral route.

4. The method according to claim 1 wherein the antiviral hydantoin is dl-5-(3',4'-dichlorophenyl)-5-methylhydantoin.

5. The method according to claim 1 wherein the antiviral hydantoin is l(−)-5-(3',4'-dichlorophenyl)-5-methylhydantoin.

6. The method for supressing viral growth which comprises applying to an in vitro habitat an effective amount of a hydantoin represented by the formula:

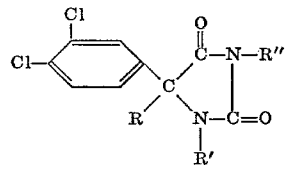

wherein R is methyl, ethyl, or isopropyl, R' and R" are hydrogen or methyl, at least one of R' and R" being hydrogen; or a nontoxic cationic salt thereof.

7. The method according to claim 6 wherein the hydantoin is applied to the in vitro viral habitat in aqueous solution at a concentration in the range 10–500 mcg./ml.

References Cited

UNITED STATES PATENTS

| | | | |
|---|---|---|---|
| 2,561,284 | 7/1951 | Long | 260—309.5 |
| 2,891,069 | 6/1959 | Thornton et al. | 260—309.5 |

SAM ROSEN, Primary Examiner

PO-1050
(5/69)

UNITED STATES PATENT OFFICE
CERTIFICATE OF CORRECTION

Patent No. 3,790,673        Dated February 5, 1974

Inventor(s) Koert Gerzon et al.

It is certified that error appears in the above-identified patent and that said Letters Patent are hereby corrected as shown below:

Column 2, line 15, "simplea lkylation" should read --simple alkylation--.

Column 3, line 15, "apperance" should read --appearance--.

Column 3, line 66, "stains" should read --strains--.

Column 4, line 21, "ministratioon" should read --ministration--.

Column 5, line 1, there is a correction in the second parenthesis. The entire line should read --5-(3',4'-dichlorophenyl)-5-methylhydantoin precipitated,--.

Column 8, line 14, after "vitro" and before "habitat" insert --virus--.

Signed and sealed this 12th day of November 1974.

(SEAL)
Attest:

McCOY M. GIBSON JR.              C. MARSHALL DANN
Attesting Officer                 Commissioner of Patents